E. KUNZLI.
TUBULAR FABRIC AND METHOD OF WEAVING THE SAME.
APPLICATION FILED JUNE 1, 1908

914,429.

Patented Mar. 9, 1909.
5 SHEETS—SHEET 1.

Witnesses:
C. A. Jarvis
G. H. Measures.

Inventor
Emil Kunzli.
By Edwards & Keck
his Attorneys.

E. KUNZLI.
TUBULAR FABRIC AND METHOD OF WEAVING THE SAME.
APPLICATION FILED JUNE 1, 1908.

914,429.

Patented Mar. 9, 1909.
5 SHEETS—SHEET 2.

E. KUNZLI.
TUBULAR FABRIC AND METHOD OF WEAVING THE SAME.
APPLICATION FILED JUNE 1, 1908.

914,429.

Patented Mar. 9, 1909.
5 SHEETS—SHEET 4.

Witnesses
C. A. Jarvis
G. H. Measures.

Inventor
Emil Kunzli
by Edwards & Peck
his attorneys

E. KUNZLI.
TUBULAR FABRIC AND METHOD OF WEAVING THE SAME.
APPLICATION FILED JUNE 1, 1908.

914,429.

Patented Mar. 9, 1909.
5 SHEETS—SHEET 5.

Witnesses:
C. A. Jarvis
G. G. Measures.

Inventor:
Emil Kunzli
By Edmonds & Heck
his Attorneys.

UNITED STATES PATENT OFFICE.

EMIL KUNZLI, OF NEW YORK, N. Y., ASSIGNOR OF ONE-FOURTH TO PETER T. BARLOW, OF NEW YORK, N. Y.

TUBULAR FABRIC AND METHOD OF WEAVING THE SAME.

No. 914,429.　　　　Specification of Letters Patent.　　　Patented March 9, 1909.

Application filed June 1, 1908. Serial No. 435,959.

*To all whom it may concern:*

Be it known that I, EMIL KUNZLI, a citizen of the United States, and a resident of the borough of Manhattan, city, county, and State of New York, have invented certain new and useful Improvements in Tubular Fabrics and the Method of Weaving the Same, of which the following is a specification, reference being had to the accompanying drawings, in which—

Figs. 1ª to 10ª are corresponding cross sectional illustrations.

Similar letters and numerals refer to similar parts throughout the several figures.

Frequently heretofore in the construction of multiple ply tubular fabrics, the sheds of woof threads are successively introduced and interwoven into the fabric during the process of weaving and are each independently interwoven with a corresponding set of warp threads of the several sets required for the weaving of such tubular fabric. Such methods of weaving cause one set of warp threads to be raised while the successive sets are depressed during the passage of the woof threads in forming such ply or strata of the fabric and such process is carried on, forming what is known in the trade as a "plain weave". The density of the woof sheds or their relative proximity to one another is measured by the natural resistance of the opposing warp series at each intersection, and in order to obtain the highest possible degree of density it has heretofore been the practice to drive the woof threads as closely as possible, whereby the indentations caused to the woof threads, at their intersection with the warp threads are substantially at right angles with each other. By such methods the resisting qualities of the tubular fabric, or the strains put upon such fabric when a heavy pressure is exerted within the walls of the fabric, are necessarily borne chiefly by the series of superimposed strands of woof threads forming a series of rings, one superimposed over the other so that the maximum degree of resistance in the fabric is measured by the tensile strength of the woof threads. Such woof threads, therefore, should be free from entanglements, and it is apparent that when these woof threads are intersected and held by the action of the opposing warp threads under pressure certain structural displacements between the warp threads and the woof threads are inevitable, whereby a friction under the increased pressure is likely to become a direct cutting action between the warp threads and the threads of the strands of woof threads directly in contact with each other. Such action or friction between such opposing threads constitutes an inherent weakness of such tubular fabric.

The object of my invention, among other things, is to construct a tubular fabric so as to do away with the transverse cutting action between the sets of woof threads and warp threads heretofore described, and in so doing I form a tubular fabric so as to obtain the maximum degree of tensile strength of the superimposed woof strands to an interior pressure, and at the same time obtain a density of the woof or filling interwoven in the fabric sufficient to insure water tightness, at the same time eliminating the friction or the water flow under pressure so that I am enabled to dispense with the customary rubber lining on the inside of my tubular fabric without any perceptible increase of friction or diminution of water pressure caused by the flow of water under pressure through my tubular fabric.

In order to accomplish my invention I construct what is known as a multiple ply woven tubular hose fabric having a series of independently operated warp threads which are constructed during the process of weaving to form what is known as a "three leaf twill" warp formation, constituting the inner wall of my improved fabric, and a similar series of warp threads forming a similar three leaf twill to constitute the outer wall or covering of my improved fabric, each of which linings or coverings constituting the three leaf twill are operated independently of each other by a separate set of three heddles.

During the process of weaving my said tubular fabric I arrange between the inner wall or lining and the outer covering a series of longitudinal threads in pairs which I term "padders" preferably having the sets of contiguous threads arranged so that the twist in such threads shall be toward each other; in other words that the twist of one thread shall be toward the right while its adjoining contigious thread will have its twist toward the left. Such threads are sometimes termed "idler" threads. I construct my tubular fabric by having these so-called padder threads inserted between the inner lining and the outer covering, and prefer to have a double set of the same separated from each other by the central series of woof threads, and connected and intermeshed with the inner lining or outer covering by a series of threads which I have termed long binders that run longitudinally through my tubular fabric and are interwoven with the outer covering on the one side and the inner lining on the other, such long binders being alternate, and do not, in either case, reach the outer or inner surface of my tubular fabric.

In order to give greater strength and to insure a more perfect union between the woof threads interwoven with the three leaf twill constituting the inner lining of my tubular fabric and the next series of woof threads adjacent to the first series of padders next to the inner lining, I provide a series of binding threads running along the length of my tubular fabric which intersect and bind together the first series of woof threads which are intermeshed with the three leaf twill forming the interior lining, with a second series of woof threads which surround the first series of padder threads. These I describe as "short" binders.

Figure 1:
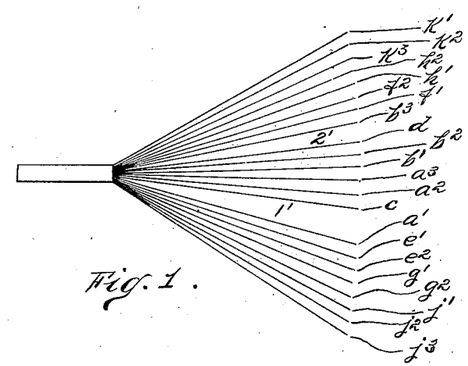
Figures 1 to 10 inclusive are diagrammatic representations of the warp threads showing the successive passage of the shuttle in order to form my improved fabric.
Figure 1A:
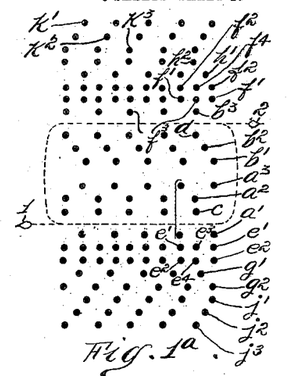

Referring now to the drawings, Fig. 1 represents, as heretofore set forth, the set of 22 series of warp threads, which go to make up the first form or position of such threads at the initial movement of the shuttle when the pick is about to make the first interweaving of the woof threads in constructing my fabric. Beginning at the center, $a'$, $a^2$, $a^3$, denote the three threads forming the three leaf twill of the inner lining on the under side. $b'$, $b^2$, $b^3$, are a like series of three warp threads forming a similar three leaf twill for the inner lining on the upper side. $c$ is a warp thread of short binders binding the under inner three leaf twill pick to the next superimposed pick of the under part of my tubular fabric. $d$ is a similar warp thread constituting a short binder on the upper side of my tubular fabric. $e'$ and $e^2$ are the padder threads carried on the under tubular section without being interlocked with the picks. $f'$ and $f^2$ are padder threads on the upper side of my tubular section, likewise not being interlocked with the picks. $g'$ and $g^2$ are the warp threads on the under tubular side forming what I term the long binders, alternating and binding and interweaving the superimposed picks 2, 3, 4 and 5, etc. of the lower tubular section. $h'$, $h^2$ are corresponding warp threads which I have termed long binders alternating and binding together with the superimposed picks 2, 3, 4, 5, etc. of the upper tubular side. $j'$, $j^2$, $j^3$, are three warp threads interwoven so as to form the outer three leaf twill of the outer covering of my tubular fabric on the under side. $k'$, $k^2$, $k^3$, are corresponding warp threads forming the three leaf twill of the outer covering on the upper side of my improved fabric. Throughout the drawings and specification, letters represent warp threads while numerals denote woof threads. It will be observed that the upper edges of these warp threads constitute the three leaf twill of the inner covering, being the warp threads $a'$, $a^2$, $a^3$, and the warp threads $b'$, $b^2$, $b^3$, are so arranged at the beginning of my weaving process that they form a perfect union in the construction of the three leaf twill forming the inner lining of my improved fabric. So likewise the outer series of warp threads $j'$, $j^2$, $j^3$, and $k'$, $k^2$, $k^3$, are so arranged at the beginning of my weaving process that they form a perfect union in the construction of the three leaf twill forming the outer covering of my improved tubular fabric with the exception of the action of the binding threads which will hereafter be described. So also the padder threads $e'$, $e^2$, $f'$, $f^2$, are arranged so as to form a continuous union at their outer edges as the process of weaving proceeds.

1 and 2, in Figs. 1 and 1ª, show the movement of the pick or shuttle during the first step in my process of inserting the woof threads in my tubular fabric.

Figure 2:
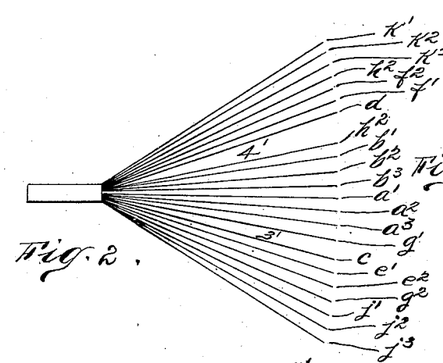
Figure 2A:
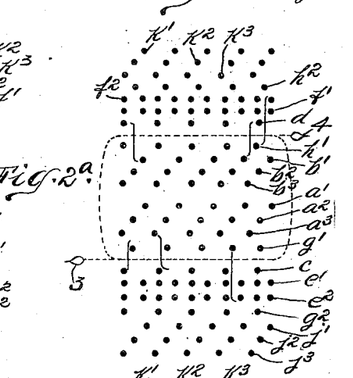

In Figs. 2 and 2ª, 3 and 4 show the second step in my process, being a diagrammatic representation of the changed relation in the various warp threads and the operation of the pick or shuttle in the second step in weaving my improved fabric, in order to form the three leaf twill constituting the inner lining and outer covering of my fabric as well as the intermeshing of the binder threads.

Figure 3:
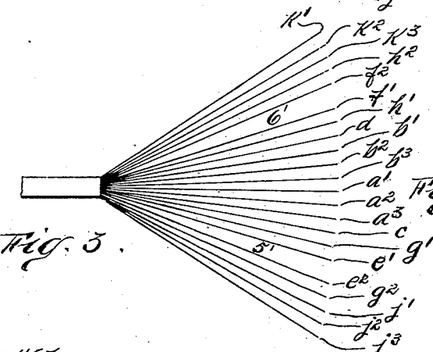
Figure 3A:
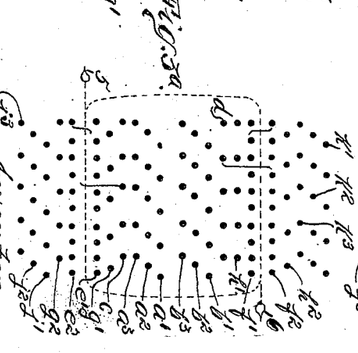

Figs. 3 and 3ª show the third step in my process of weaving my improved fabric and 5 and 6 show the passage of the shuttle or pick interweaving the woof threads in such step or process, and also illustrating the changed relation of the various woof threads constituting the three leaf twill of the inner lining and outer covering, as well as the action of the binding threads.

Figures 4, 4A:
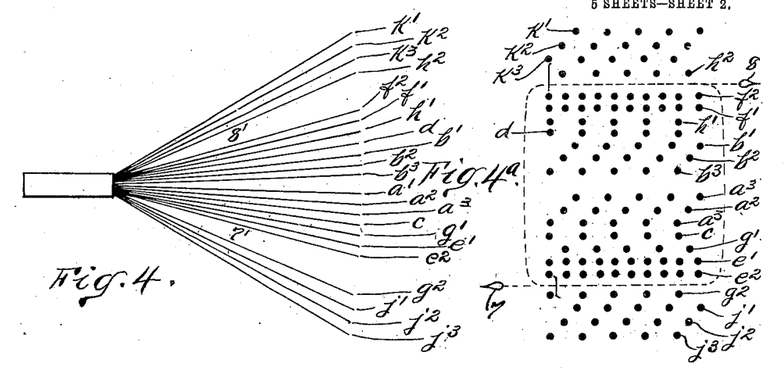

Figs. 4 and 4ª show the fourth step in my process of weaving my improved fabric and 7 and 8 show the passage of the shuttle or pick in interweaving the woof threads and the series of warp threads shown in the figures.

Figures 5, 5A:
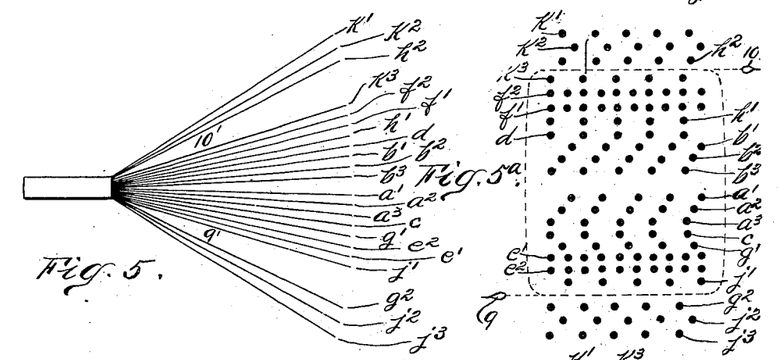

Figs. 5 and 5ª represent the fifth step in my process of weaving my improved fabric and 9 and 10 show the passage of the shuttle or pick in interweaving the woof threads with a series of warp threads shown in the figures. This fifth step in the process of weaving my improved fabric completes the first cycle, and it will be observed that the shuttle or picks 9 and 10 have carried the woof threads so as to intermesh between one of the threads forming the outer three leaf twill on the inside and the other two warp threads forming the three leaf twill of the outer covering together with one of the long binders.

Figures 6, 6A:
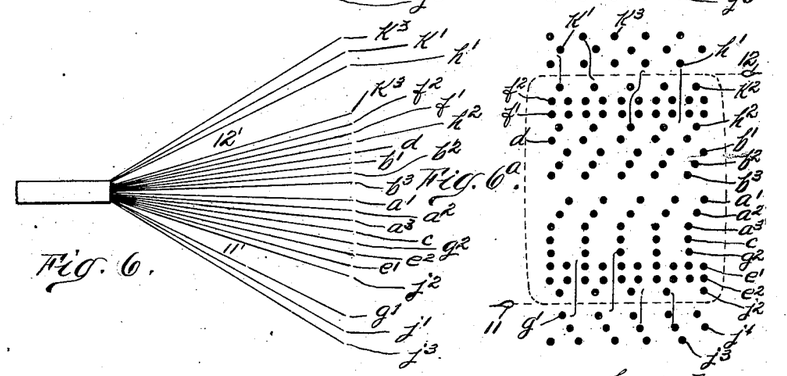

Figs. 6 and 6ª represent the return movement of the shuttle or picks 11 and 12 in which the passage of such shuttle discloses on the outside two of the woof threads forming the three leaf twill of the outer covering with the second long binder and on the inner side the warp thread of the three leaf twill forming the outer covering which was formerly on the outer surface of my tubular fabric, all of which is fully shown in the diagrammatic and cross sectional views of such warp threads.

Figures 7, 7A:
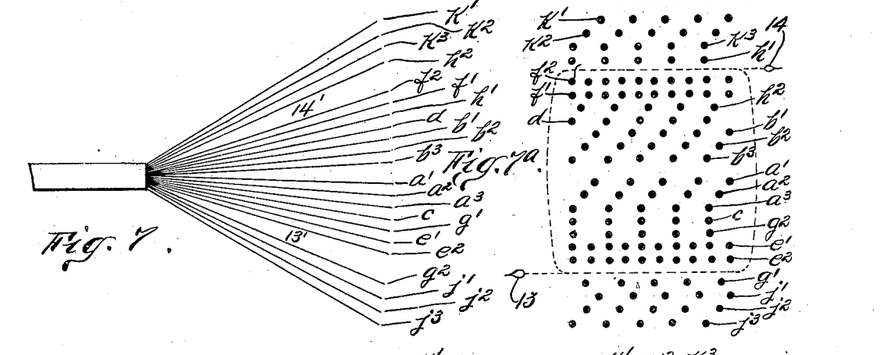
Figures 8, 8A:
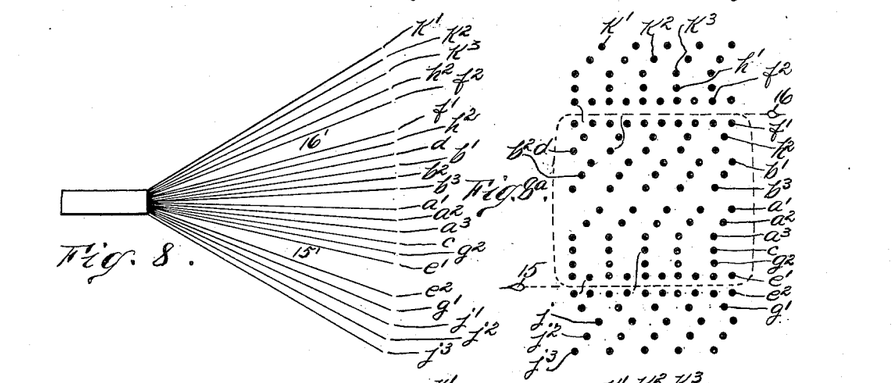
Figures 9, 9A:
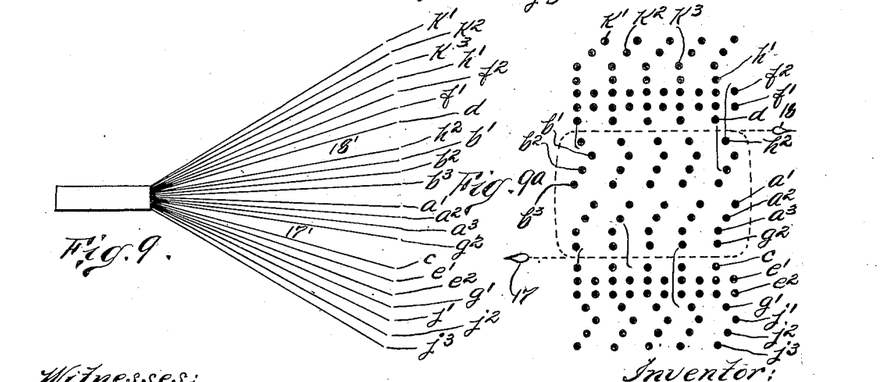
Figures 10, 10A:
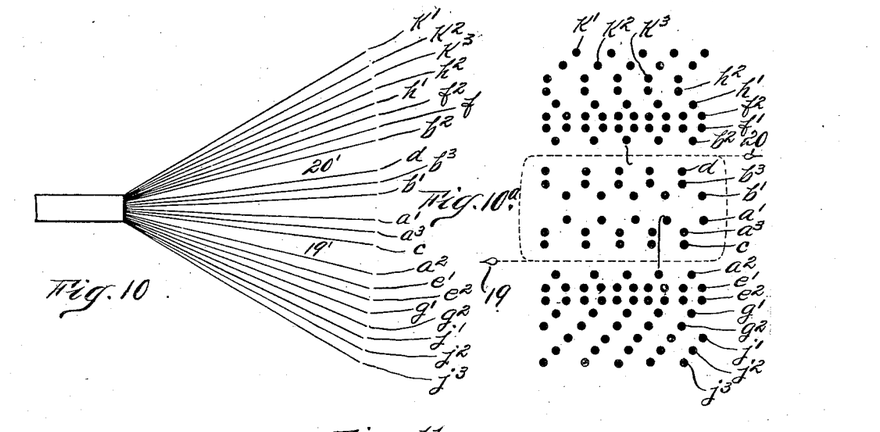

Figs. 7 and 7ª, Figs. 8 and 8ª, Figs. 9 and 9ª and Figs. 10 and 10ª show the passage of the shuttle or picks 13 and 14 respectively, 15 and 16 respectively, 17 and 18 respectively and 19 and 20 respectively in the reverse order as shown in Figs. 1 to 4 and 1ª to 4ª inclusive heretofore described. These Figs. 7 to 10 inclusive and 7ª to 10ª inclusive represent in diagram and cross section the various warp threads heretofore described, and illustrate clearly in the method of weaving my improved tubular fabric the passage of the woof threads so as to complete the cycle necessary to form my improved fabric which, as shown in the drawing, consists in a five ply series of woof threads.

Figure 11:
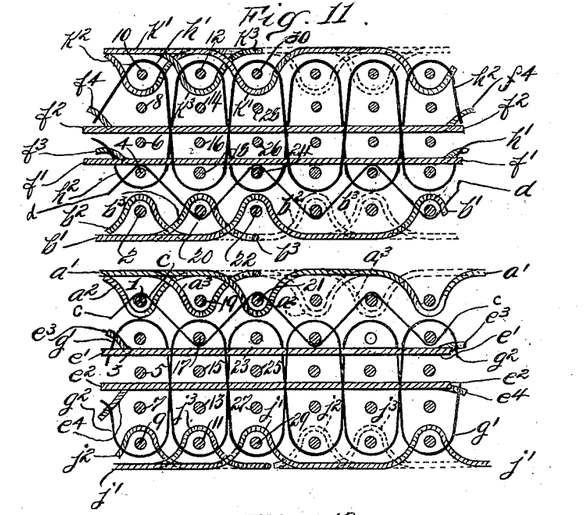
Fig. 11 is a central longitudinal elevation in cross section showing the construction of my improved fabric together with the woof threads, the opening between the upper and lower cross sectional illustrations being the central opening of my improved tubular fabric.

Referring to Fig. 11, this view shows, in an enlarged cross section taken longitudinally, my tubular fabric as completed, the same letters referring to the same warp threads and the numbers 1 to 30 inclusive showing the woof threads as they exist in my fabric, such woof threads referred to numerically being the same as shown in the picks or shuttles heretofore described in connection with Figs. 1 to 10 and 1ª to 10ª inclusive. I have also shown by $e^3$ and $e^4$ and $f^3$ and $f^4$ at either end of Fig. 11 the relative position of the padder threads having the reverse twist adjoining the padder threads $e'$, $e^2$, $f'$, $f^2$, respectively, such reverse padder threads $e^3$, $e^4$, and $f^3$, $f^4$, being turned up at the end, so as to show the insertion of the long binders $g'$, $g^2$, and $h'$, $h^2$, respectively between such series of padder threads. In Fig. 11 the relation of such long binders to the constituent fabric is clearly shown; likewise the relation and action of the short binder threads $c$ and $d$.

Figure 12:
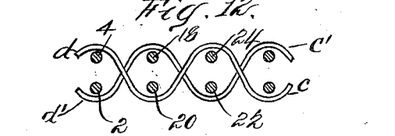
Fig. 12 is a view in central cross section of part of Fig. 11, showing a modified form of inserting a double series of short binders.

In Fig. 12 a modified form of a method of inserting the short binder threads $c$ and $d$ is illustrated, whereby a second short binder thread $d'$, $c'$, may be inserted so as to combine the two inner series of woof threads 2, 4, 18, 20, 22, 24, etc. as shown in the drawings.

Figure 13:
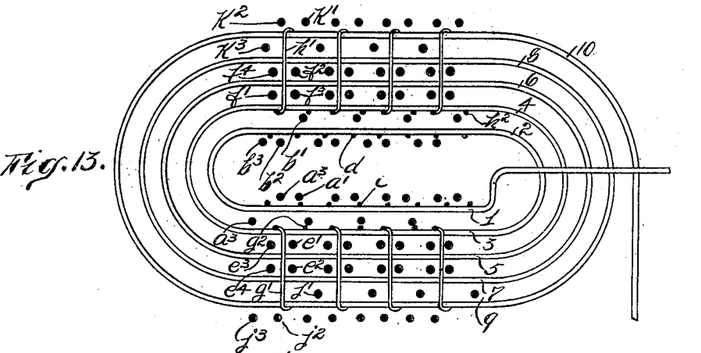
Figs. 13 to 15 inclusive show sectional views of my improved fabric, illustrating particularly the mode of inserting the woof threads throughout the several cycles necessary to form the complete tubular fabric.
Figure 14:
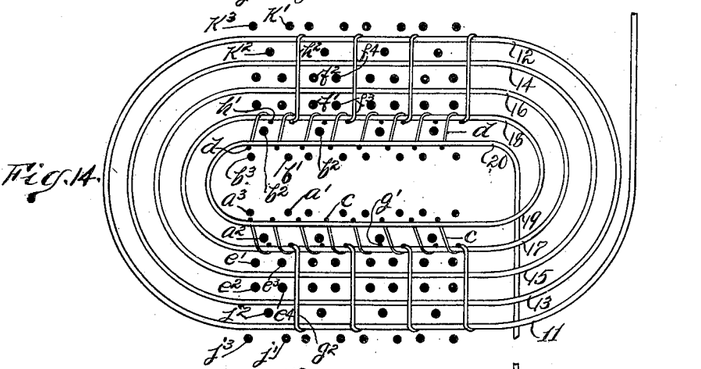
Figure 15:
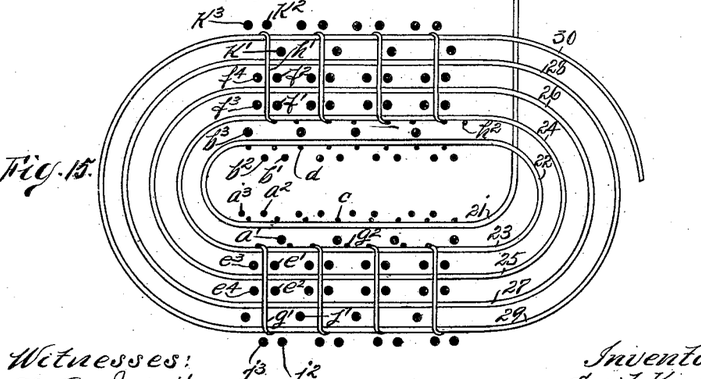

Figs. 13, 14 and 15 are, as heretofore described, cross sectional views of my improved fabric, showing by the round dots the various series of warp threads that constitute my fabric as shown in Figs. 1 to 10 and 1ª to 10ª inclusive, together with the double line which shows in diagrammatic form the passage of the shuttle from the initial passage shown in Fig. 13 where the pick enters and carries the woof thread so as to form the first series of inner woof threads and thereafter proceeding and intermeshing with the various warp threads as heretofore shown in the diagrammatic figures through five revolutions, where it finally emerges at the outer covering of my fabric and then passes to Fig. 14 where the reverse operation is pursued so that after five circular passages of the shuttle the picks emerge at the inner lining of my improved fabric and then pass on down to Fig. 15 which illustrates the third cycle and passage of the shuttle carrying the woof threads through five revolutions until it emerges at the outer covering of my tubular fabric, and then the shuttle will pass through the same movements as shown in Fig. 14 and then, as shown in Fig. 13, completing the entire movement of the shuttle carrying the woof threads so as to finally complete and constitute a tubular fabric such as is shown entire in longitudinal cross section in Fig. 11.

In Figs. 13, 14 and 15 the numbers 1 to 20 inclusive show the woof threads as carried by the shuttle, such numbers corresponding to the numbers shown in Figs. 1ª to 10ª inclusive by the dotted lines, and such woof threads are also shown in cross section in Fig. 11. In Figs. 1 to 10 inclusive, the numerals which are primed, as for instance 1', 2', 3', 4', etc., illustrate the sheds where the shuttle carries the woof threads through the warp threads illustrated in Figs. 1 to 10 inclusive, such sheds having the same number as the pick which passes through, as for example pick 5 passes through shed 5' and pick 6 through shed 6'.

It will be observed from the construction of my tubular fabric that the relations between the various threads constituting my fabric permits the closest possible packing between the various series of woof strands which go to make up my multiple ply fabric, the action of the binders tending to hold such woof strands closely together, and also, when my fabric is in use, as for instance during the passage of water under pressure, such pressure, being exerted outwardly, will also tend to pack still more closely the various plies of woof threads, while the three leaf twill formation, which I use for my inner lining, as well as outer covering, from its very construction tends to prevent the increase of diameter of my fabric or swelling of such fabric from interior pressure, the only tendency of such three leaf twill being to create a smooth surface. The insertion of the "padder" threads heretofore described prevents the stretching of my fabric, and in order to reduce the friction on the inner lining I may soak such three leaf twill threads, prior to the formation of my fabric, in paraffin or oil, so as to minimize the friction incident to the passage of water under pressure through my fabric.

Throughout the foregoing specification I have referred to the exterior covering and inner lining, as being of the three leaf twill formation, but I do not wish to confine myself to this particular form of weave, for a four or even five leaf twill may be employed in the construction of my tubular fabric, with the same effects and advantages.

Instead of having a single continuous woof thread to form the multiple plies of my fabric I may also use two shuttles thereby intermeshing with the various series of warp threads, two continuous woof threads, one forming the multiple plies by running concentrically through the floating warp thread of the inner lining, and the "short" binders, while the other woof thread intermeshes the short binders the padder threads, and the floating warp thread of the exterior covering.

What I claim as new and desire to secure by Letters Patent is the following, viz:—

1. A multiple ply tubular fabric comprising a continuously woven tube, comprising an exterior covering formed by warp threads woven in a three leaf twill, an inner lining of warp threads likewise woven in the form of a three leaf twill, warp threads forming an interior filling between the exterior covering and inner lining, continuous woof thread forming multiple plies by intermeshing with the exterior covering, inner lining and interior filling, and a series of binding warp threads, intermeshing said exterior covering, said woof thread, said interior filling and said inner lining, substantially as described.

2. A multiple ply tubular fabric comprising a continuously woven tube, comprising an exterior covering formed by warp threads woven in a multiple leaf twill, an inner lining of warp threads likewise woven in the form of a multiple leaf twill, warp threads forming an interior filling between the exterior covering and inner lining, continuous woof thread forming multiple plies by intermeshing with the exterior covering, inner lining and interior filling, and a series of binding warp threads, intermeshing said exterior covering, said woof thread, said interior filling and said inner lining, substantially as described.

3. A multiple ply tubular fabric comprising a continuously woven tube, comprising an exterior covering formed by warp threads woven in a three leaf twill, an inner lining of warp threads likewise woven in the form of a three leaf twill, longitudinal warp threads forming padders between the exterior covering and inner lining, the contiguous padder threads having reverse twists, continuous woof thread forming multiple plies by intermeshing with the exterior covering, inner lining and padder threads, and a series of binding warp threads intermeshing said exterior covering, said woof thread, said padder threads and said inner lining, substantially as described.

4. A multiple ply tubular fabric comprising a continuously woven tube, comprising an exterior covering formed by warp threads woven in a multiple leaf twill, an inner lining of warp threads likewise woven in the form of a multiple leaf twill, longitudinal warp threads forming padders between the exterior covering and inner lining, the contiguous padder threads having reverse twists, continuous woof thread forming multiple plies by intermeshing with the exterior covering, inner lining and padder threads, and a series of binding warp threads intermeshing said exterior covering, said woof thread, said padder threads and said inner lining, substantially as described.

5. A multiple ply tubular fabric comprising a continuously woven tube, comprising an exterior covering formed by warp threads woven in a three leaf twill, an inner lining of warp threads likewise woven in the form of a three leaf twill, longitudinal warp threads forming padders between the exterior covering and inner lining, the contiguous padder threads having reverse twists, continuous woof thread forming multiple plies by intermeshing with the exterior covering, inner lining and padder threads, a series of binding warp threads intermeshing said exterior covering with the woof thread interwoven between the padder threads and likewise binding the woof thread between the padder threads and said inner lining, a series of binding warp threads intermeshing said inner lining with said woof thread between the padder threads and said inner lining, substantially as described.

6. A multiple ply tubular fabric comprising a continuously woven tube, comprising an exterior covering formed by warp threads woven in a multiple leaf twill, an inner lining of warp threads likewise woven in the form of a multiple leaf twill, longitudinal warp threads forming padders between the exterior covering and inner lining, the contiguous padder threads having reverse twists, continuous woof thread forming multiple plies by intermeshing with the exterior covering, inner lining and padder threads, a series of binding warp threads intermeshing said exterior covering with the woof thread interwoven between the padder threads and likewise binding the woof thread between the padder threads and said inner lining, a series of binding warp threads intermeshing said inner lining with said woof thread between the padder threads and said inner lining, substantially as described.

7. A five ply tubular fabric comprising a continuously woven tube, comprising an exterior covering formed by a series of three warp threads woven in a three leaf twill, an inner lining formed by a series of three warp threads, likewise woven in the form of a three leaf twill, a series of longitudinal warp threads forming padder threads, the contiguous padder threads having reverse twists, a second series of longitudinal warp threads forming padder threads the contiguous padder threads likewise having reverse twists, continuous woof thread forming the five ply tubular fabric by running concentrically through the inner floating warp thread of the exterior covering, between said exterior covering and the first series of said padder threads, between said first and second series of said padder threads, between the second series of said padder threads, and running through the inner floating warp thread of said inner lining, a series of binding warp threads, intermeshing said exterior covering with the woof thread, interwoven between the second series of padder threads and the woof thread between said second series of padder threads and said inner lining, and a series of binding warp threads intermeshing said inner lining with said woof thread between said second series of padder threads and said inner lining, substantially as described.

8. A five ply tubular fabric comprising a continuously woven tube, comprising an exterior covering formed by a series of warp threads woven in a multiple leaf twill an inner lining formed by a series of warp threads, likewise woven in the form of a multiple leaf twill, a series of longitudinal warp threads forming padder threads, the contiguous padder threads having reverse twists, a second series of longitudinal warp threads forming padder threads the contiguous padder threads likewise having reverse twists, continuous woof thread forming the five ply tubular fabric by running concentrically through the inner floating warp thread of the exterior covering, between said exterior covering and the first series of said padder threads, between said first and second series of said padder threads, between the second series of said padder threads, and running through the inner floating warp thread of said inner lining, a series of binding warp threads, intermeshing said exterior covering with the woof thread, interwoven between the second series of padder threads and the woof thread between said second series of padder threads and said inner lining, and a series of binding warp threads intermeshing said inner lining with said woof thread between said second series of padder threads and said inner lining, substantially as described.

9. A multiple ply tubular fabric comprising a continuously woven tube, comprising an exterior covering formed by warp threads woven in a three leaf twill, an inner lining of warp threads likewise woven in the form of a three leaf twill, warp threads forming an interior filling of padder threads between the exterior covering and the inner lining, one series of binding warp threads intermeshing said exterior covering with the woof thread interwoven between the padder threads and likewise binding the woof thread between the padder threads and said inner lining, a second series of binding warp threads intermeshing said inner lining with said woof thread between the padder thread and said inner lining, and continuous woof threads forming multiple plies by intermeshing the floating warp thread of the inner lining with the second series of binding warp threads, and by intermeshing said second series of binding warp threads, said padder threads, and said exterior covering, substantially as described.

10. A multiple ply tubular fabric comprising a continuously wooven tube, comprising an exterior covering formed by warp threads woven in a multiple leaf twill, an inner lining of warp threads likewise woven in the form of a multiple leaf twill, warp threads forming an interior filling of padder threads between the exterior covering and the inner lining, one series of binding warp threads intermeshing said exterior covering with the woof thread interwoven between the padder threads and likewise binding the woof thread between the padder threads and said inner lining, a second series of binding warp threads intermeshing said inner lining with said woof thread between the padder thread and said inner lining, and continuous woof threads forming multiple plies by intermeshing the floating warp thread of the inner lining with the second series of binding warp threads, and by intermeshing said second series of binding warp threads, said padder threads, and said exterior covering, substantially as described.

11. The method of weaving multiple ply tubular fabric which comprises arranging a series of warp threads so as to form an exterior covering of three leaf twill formation, an inner lining of similar three leaf twill formation, and an interior filling between said exterior covering and inner lining; then inserting binding warp threads to intermesh said exterior covering, said inner lining and said interior filling; then inserting continuous woof thread between the sheds so as to form said multiple ply tubular fabric, said woof thread operating to intermesh the exterior covering, the inner lining, and the interior filling, and running alternately from the three leaf twill formation of the inner lining to the three leaf twill formation of the exterior covering, and from the exterior covering to the inner lining, so as to form a continuously woven tube, substantially as described.

12. The method of weaving a multiple ply tubular fabric which comprises arranging a series of warp threads so as to form an exterior covering of a three leaf twill formation, also to form an inner lining of three leaf twill formation; then inserting longitudinal warp threads forming padders between the exterior covering and the inner lining; inserting binding warp threads to intermesh said exterior covering, said inner lining and said padder threads; then running continuous woof thread between the sheds so as to form the multiple plies by intermeshing with the exterior covering the inner lining and the padder threads, substantially as described.

13. The method of weaving a multiple ply tubular fabric which comprises arranging a series of warp threads so as to form an exterior covering of a three leaf twill formation; also to form an inner lining of similar three leaf twill formation; then inserting longitudinal warp threads forming padders between the exterior covering and the inner lining; then running continuous woof thread inwardly and outwardly to form the multiple plies by intermeshing with the exterior covering, the inner lining and the padder threads; then inserting a series of binding warp threads intermeshing said exterior covering with the warp threads interwoven between the padder threads, so as to bind the inner lining, and finally inserting a series of binding warp threads intermeshing said inner lining with said woof thread, between the padder threads and said inner lining, substantially as described.

14. The method of weaving a five ply tubular fabric comprising a continuously woven tube which comprises arranging a series of three warp threads, so as to form an exterior covering of a three leaf twill formation; also in arranging a similar series of three warp threads so as to form an inner lining of similar three leaf twill formation; then inserting a double series of longitudinal warp threads to form padders, the contiguous padder threads in each series having reverse twists; then inserting a double series of binding warp threads, one series to bind the exterior covering and double series of padder threads with the outer woof thread, and the other series of binding warp threads to bind the inner lining with said outer woof thread; and then running continuous woof thread, concentrically through the sheds so as to form the five ply tubular fabric, by intermeshing said exterior covering, said inner lining and said padder threads, substantially as described.

15. The method of weaving multiple ply tubular fabric which comprises arranging a series of warp threads so as to form an exterior covering of three leaf twill formation, an inner lining of warp threads of similar three leaf twill formation, and an interior filling between the exterior covering and the inner lining; then inserting one series of binding warp threads intermeshing said exterior covering with the woof thread interwoven between the interior filling likewise binding the woof thread between the interior filling and said inner lining; then inserting a second series of binding warp threads intermeshing said inner lining with said woof thread between the interior filling and said inner lining; then simultaneously running continuous woof threads between the sheds so as to form the multiple plies, by intermeshing the floating warp thread of the inner lining with the second series of binding warp threads, and by intermeshing the second series of binding warp threads, said interior filling and said exterior covering, substantially as described.

16. The method of weaving multiple ply tubular fabric which comprises arranging a series of warp threads so as to form an exterior covering of multiple leaf twill formation, an inner lining of warp threads of similar multiple leaf twill formation, and an interior filling between the exterior covering and the inner lining; then inserting one series of binding warp threads intermeshing said exterior covering with the warp thread interwoven between the interior filling likewise binding the woof thread between the interior filling and said inner lining; then inserting a second series of binding warp threads intermeshing said inner lining with said woof thread between the interior filling and said inner lining; then simultaneously running continuous woof threads between the sheds so as to form the multiple plies, by intermeshing the floating warp thread of the inner lining with the second series of binding warp threads, and by intermeshing the second series of binding warp threads, said interior filling and said exterior covering, substantially as described.

17. The method of weaving multiple ply tubular fabric which comprises arranging a series of warp threads so as to form an exterior covering of multiple leaf twill formation, an inner lining of similar multiple leaf twill formation, and an interior filling between said exterior covering and inner lining; then inserting binding warp threads to intermesh said exterior covering, said inner lining and said interior filling; then simultaneously running continuous woof threads between the sheds so as to form the multiple plies, by intermeshing the floating warp thread of the inner lining with the binding warp threads, and by intermeshing said binding warp threads, said interior filling and said exterior covering, both woof threads running alternately from their respective plies so as to form a continuously woven tube, substantially as described.

18. The method of weaving a multiple ply tubular fabric which comprises arranging a series of warp threads so as to form an exterior covering of multiple leaf twill formation, also to form an inner lining of multiple leaf twill formation; then inserting longitudinal warp threads forming padders between the exterior covering and the inner lining; inserting binding warp threads to intermesh said exterior covering, said inner lining and said padder threads; then simultaneously running continuous woof threads between the sheds so as to form the multiple plies, by intermeshing the floating warp thread of the inner lining with the binding warp threads, and by intermeshing said binding warp threads, said interior filling and said exterior covering, both woof threads running alternately from their respective plies so as to form a continuously woven tube, substantially as described.

19. The method of weaving a multiple ply tubular fabric which comprises arranging a series of warp threads so as to form an exterior covering of multiple twill formation; also to form an inner lining of similar multiple leaf twill formation; then inserting longitudinal warp threads forming padders between the exterior covering and the inner lining; then inserting a series of binding warp threads intermeshing said exterior warp threads interwoven covering with the warp threads interwoven between the padder threads, so as to bind the inner lining, and finally inserting a series of binding warp threads intermeshing said inner lining with said woof thread, between the padder threads and said inner lining; then simultaneously running continuous woof threads between the sheds so as to form the multiple plies, by intermeshing the floating warp thread of the inner lining with the binding warp threads, and by intermeshing said binding warp threads, said interior filling and said exterior covering, both woof threads running alternately from these respective plies so as to form a cintinuously woven tube, substantially as described.

20. The method of weaving a five ply tubular fabric comprising a continuously woven tube which comprises arranging a series of warp threads, so as to form an exterior covering of a multiple leaf twill formation; also in arranging a similar series of warp threads so as to form an inner lining of similar multiple leaf twill formation; then inserting a double series of longitudinal warp threads to form padders, the contiguous padder threads in each series having reverse twists; then inserting a double series of binding warp threads, one series to bind the exterior covering and double series of padder threads with the outer woof thread, and the other series of binding warp threads to bind the inner lining with said outer woof thread; then simultaneously running continuous woof threads between the sheds so as to form the multiple plies, by intermeshing the floating warp thread of the inner lining with the binding warp threads, and by intermeshing said binding warp threads, said interior filling and said exterior covering, both woof threads running alternately from these respective plies so as to form a continuously woven tube, substantially as described.

In witness whereof I have hereunto subscribed my name in the presence of two subscribing witnesses, this 29th day of May 1908.

EMIL KUNZLI.

Witnesses:
PHILIP C. PECK,
G. G. MEASURES.